W. T. HUDSON & P. R. CAMP.
CANDY MAKING MACHINE.
APPLICATION FILED FEB. 8, 1909.
933,987.
Patented Sept. 14, 1909.
3 SHEETS—SHEET 1.
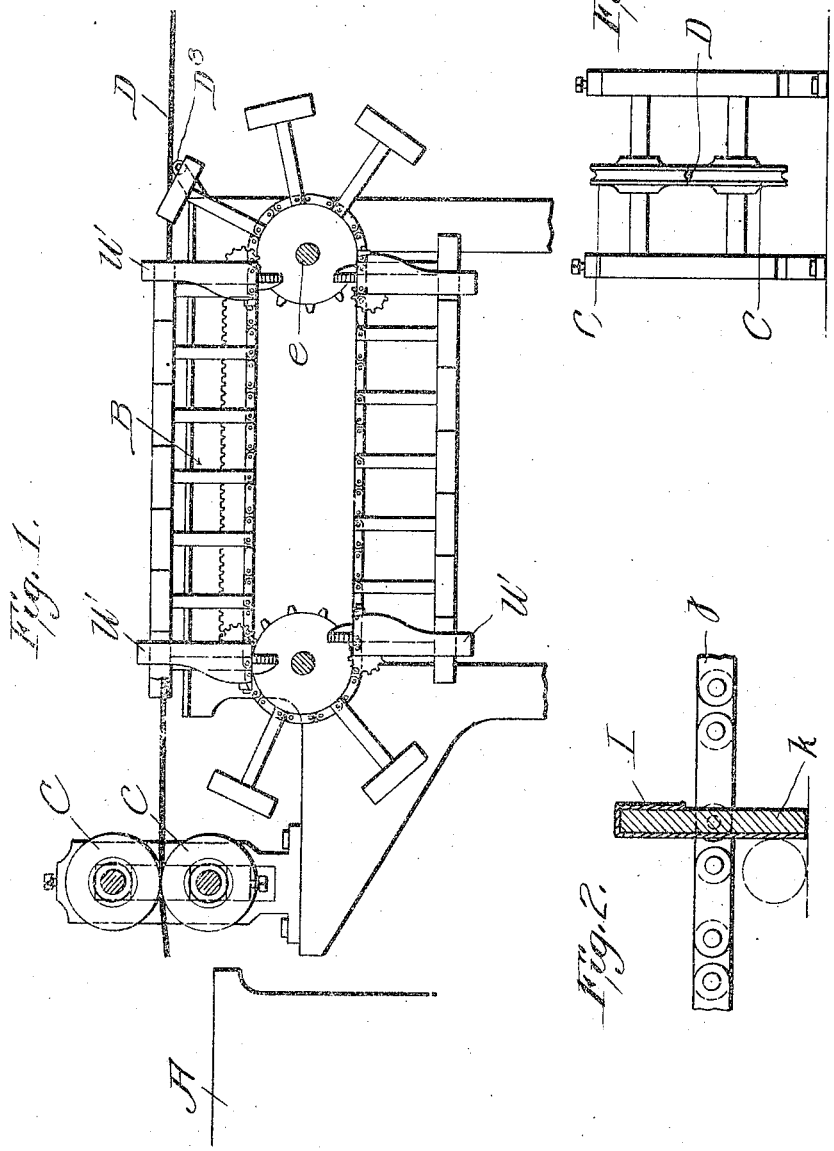
Witnesses
Inventors
William T. Hudson &
Paul R. Camp
By James Sheehy
Attorney

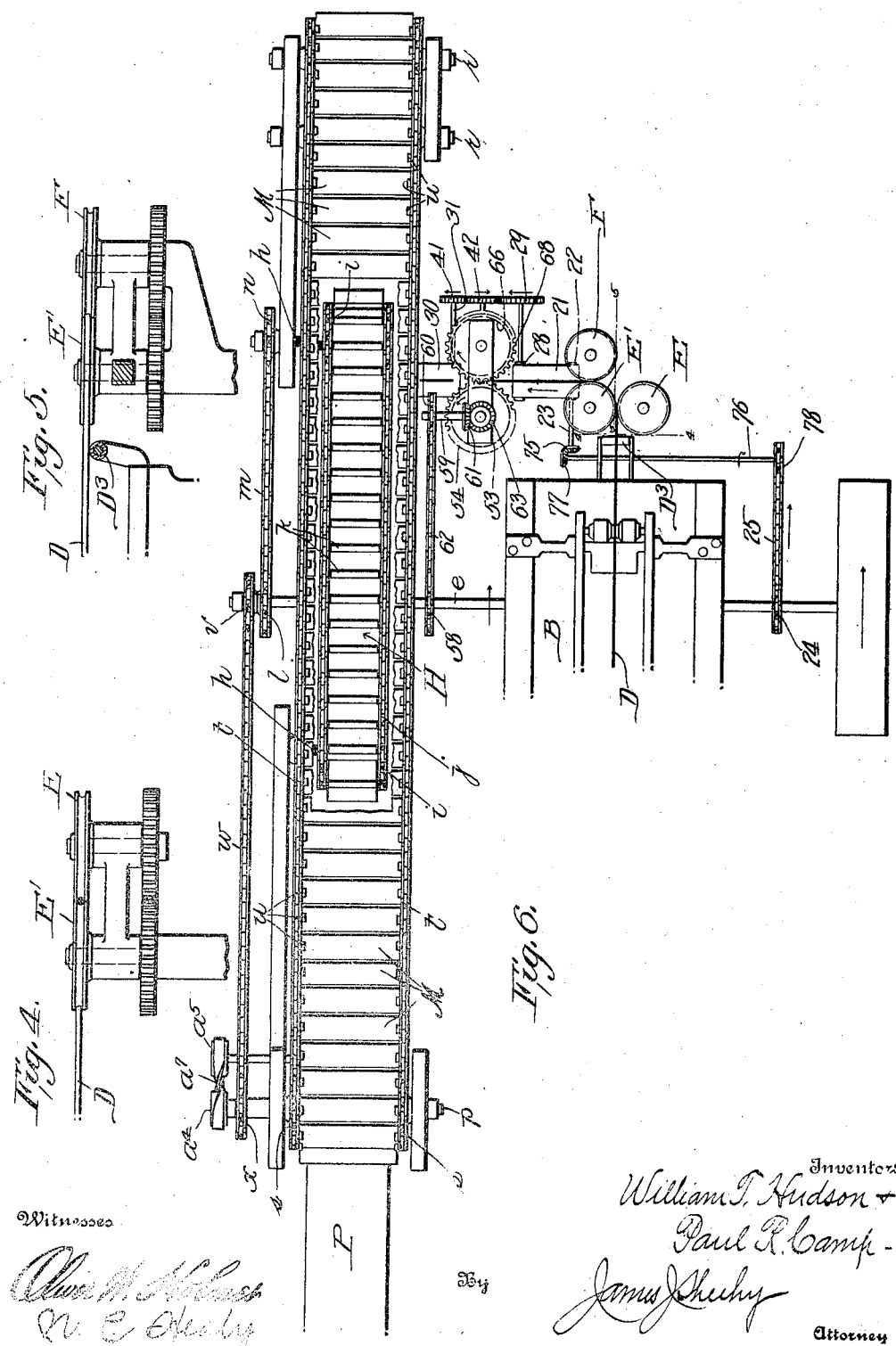

W. T. HUDSON & P. R. CAMP.
CANDY MAKING MACHINE.
APPLICATION FILED FEB. 8, 1909.
933,987.
Patented Sept. 14, 1909.
3 SHEETS—SHEET 3.
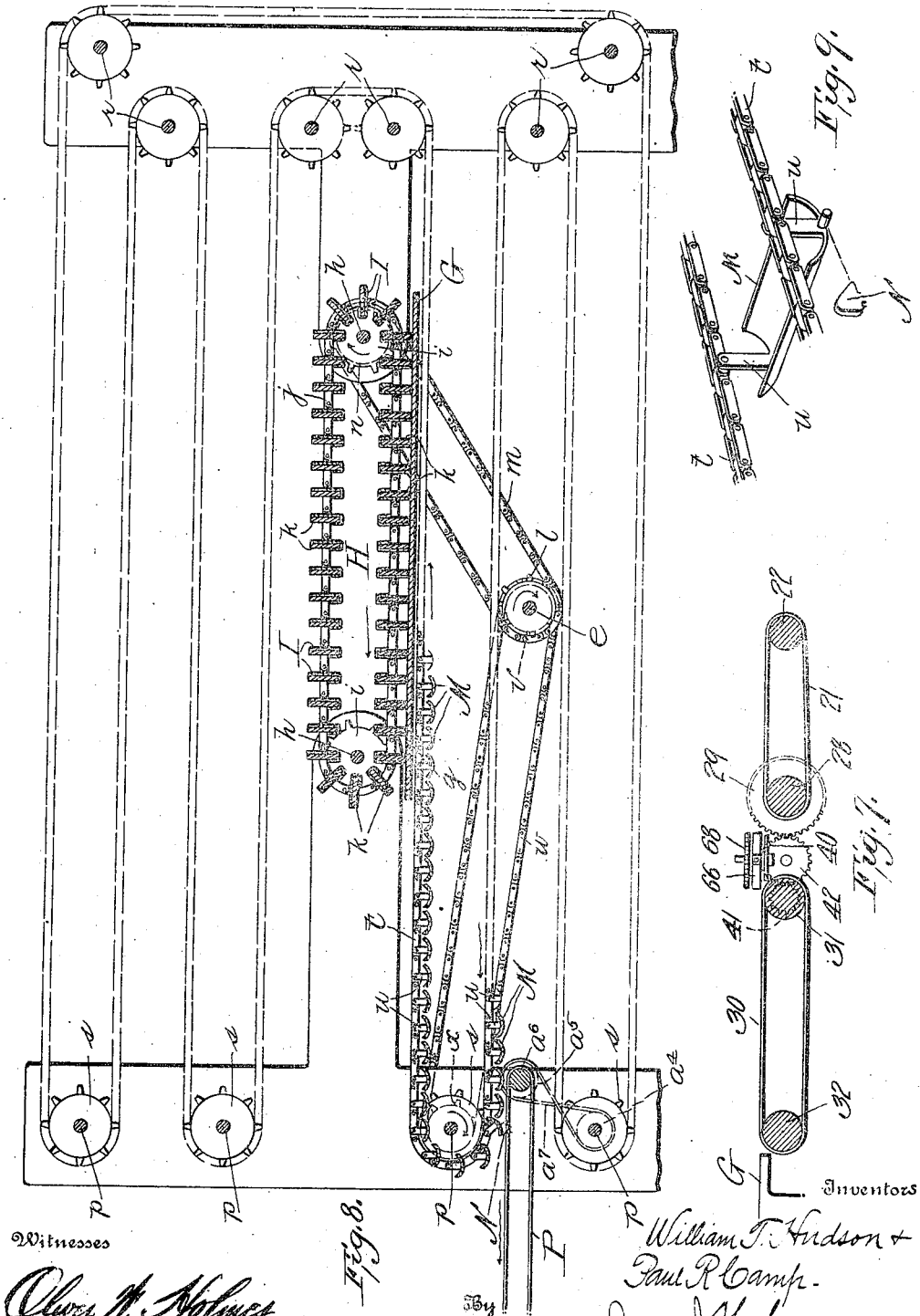
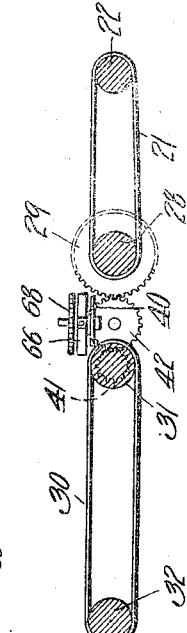

UNITED STATES PATENT OFFICE.

WILLIAM T. HUDSON AND PAUL R. CAMP, OF ATLANTA, GEORGIA, ASSIGNORS TO HUDSON STICK CANDY MACHINE COMPANY, OF ATLANTA, GEORGIA.

CANDY-MAKING MACHINE.

933,987.

Specification of Letters Patent. Patented Sept. 14, 1909.

Application filed February 8, 1909. Serial No. 476,717.

*To all whom it may concern:*

Be it known that we, WILLIAM T. HUDSON and PAUL R. CAMP, citizens of the United States, residing at Atlanta, in the county of Fulton and State of Georgia, have invented new and useful Improvements in Candy-Making Machines, of which the following is a specification.

Our invention has to do with the making of stick candy, and is designed more particularly as an improvement upon the candy making machine constituting the subject matter of the Hudson Letters-Patent No. 910,198 of January 19, 1909.

One of the objects of our invention is the provision, in a machine of the kind stated, of means for acting on the strip of candy material after the same is twisted, with a view of eliminating from the strip the roughness left by the twisters.

Another object in the provision of improved means for straightening the severed sections or sticks of candy.

Another object is the provision of straightening means embodying such a construction that it may be readily cleaned or cleared of collected candy material.

Another object is the provision of efficient means for cooling the severed sections or sticks of candy without changing the shape or form of or otherwise impairing the same.

Other objects and features of advantage of our invention will be fully understood from the following description and claims when the same are read in connection with the drawings, accompanying and forming part of this specification, in which:

Figure 1 is a vertical section showing a portion of the machine constructed in accordance with our invention. Fig. 2 is an enlarged detail section showing one of the transverse bars of the carrier means comprised in the straightening mechanism. Fig. 3 is a detail section taken at a right angle to Fig. 1 and showing the manner in which the strip of candy material passes between the spinners precedent to being engaged by one of the twisters of the twisting mechanism. Figs. 4 and 5 are detail sections taken in the planes indicated by the lines 4—4 and 5—5, respectively, of Fig. 6, and showing the passage of the candy between the smoothing rollers and between one of the smoothing rollers and the guide rollers, respectively. Fig. 6 is a detail plan view of the machine with part of the cooler broken away, and showing the several driving connections we prefer to employ. Fig. 7 is a detail section taken in the plane indicated by the line 7—7 of Fig. 6, and showing the slow and fast belts and the means for transmitting motion from the slow belt to the fast belt. Fig. 8 is a section taken through the straightening mechanism and the cooler mechanism in the plane indicated by the line 8—8 of Fig. 6. Fig. 9 is an enlarged detail view showing the manner in which the tappet or trip operates to dump each stick-carrier or tray of the cooler mechanism.

Similar letters and numerals of reference designate corresponding parts in all of the views of the drawings.

In carrying our invention into effect, we prefer to employ twisting mechanism identical with that of the Hudson patent *supra*, and shown in Fig. 1 hereof in the same manner that it is illustrated in Fig. 9 of the patent. We also prefer to employ a spinning board or table A for the candy material, and to arrange between the said board or table and the twisting means, lettered B, spinners C—*i. e.*, superposed rollers having opposed circumferential grooves corresponding in cross-section shape and size to the strip of candy material, which strip is shown by a heavy line and is lettered D. The twisters U' of the mechanism B are moved in the direction indicated by the arrow in Fig. 1 by power suitably applied to one of the shafts, preferably the shaft *e*, of said mechanism, and the candy material, which passes from the table A between the spinners C, is carried by the twisters U' to an idler supporting roller D³ and while *en route* is twisted. After passing over the roller D³ the twisted candy strip is carried between suitably supported rollers E E' which have opposed circumferential grooves and are adapted to serve the important function of eliminating or effacing the roughness left by the twisters U' which take positive hold of and carry the candy strip. After passing between the rollers E and E', the strip of candy material is carried by a suitably supported guide roller F, arranged opposite and coöperating with the smoothing roller E', to take a course at a right angle to its former course and pass upon a belt 21 which is moved at a rate of speed corresponding to that at which the strip is moved by the twisters U' of mechanism B. The said belt 21 passes around a roller 22, located below the rollers E' and F, Fig. 7, and said roller 22 is fixed on a shaft 23 which is driven from the shaft e of the twisting means through a sprocket wheel 24 on said shaft e, a sprocket belt 25, a miter gear 75 on shaft 23, and a shaft 76 disposed at a right angle to the shaft 23 and having a miter gear 77, intermeshed with the gear 75 and also having a sprocket wheel 78 connected with the belt 25. The belt 21 passes around and rotates a roller 28 with respect to which is fixed a spur gear 29. The belt 21 carries the strip of candy material to the means, hereinafter described, for severing sections or sticks of the desired length from the strip, and in order to speedily move each section or stick, as cut, away from the advancing strip, with a view of precluding rejoining of the adjacent ends of the worm strip and section or stick, we employ the comparatively fast belt 30. This belt 30 passes around rollers 31 and 32, and is driven faster than the belt 21 through the medium of the spur gear 29 fixed to roller 28, the smaller spur gear 41 fixed to roller 31, and a spur gear 42 arranged between and intermeshed with the gears 29 and 41. From the belt 21 the candy passes over a bridge 40 to the belt 30, and while the candy is above said bridge, a stick or section is severed from the strip, after which the stick or section is moved at a comparatively high rate of speed by the belt 30 toward the table G, presently described, and is carried by the momentum it gains upon the said table.

The mechanism for cutting the candy— i. e., severing the sticks or sections from the strip, is preferably identical with the cutting mechanism shown in Figs. 1, 2, 9 and 11 of the aforesaid Hudson patent, and need not, therefore, be described herein except to say that among other elements it comprises two rotatable bodies 53 and 66 connected by intermeshed spur gears 54 and 68, Fig. 6, and that the body 53 is rotated from the shaft e of the twisting mechanism through a sprocket gear 58 on the shaft e, a suitably supported horizontal shaft 59 carrying a sprocket gear 60 and a miter gear 61, a sprocket belt 62 connecting the sprocket gears 58 and 60, and a miter gear 63 fixed with respect to the spur gear 54 and the rotatable body 53 and intermeshed with the miter gear 61.

The table G upon which the sticks or sections of candy are impelled from the belt 30, as before described, is arranged parallel to the twisting mechanism B and at a right angle to said belt 30, and is provided at g with an opening of a length and width to permit a stick or section of candy to freely drop therethrough, for a purpose hereinafter set forth. The said table G is suitably supported and held against movement, and is designed to coöperate with carrier mechanism H in straightening the sticks or sections of candy; the said carrier mechanism H being arranged above the table G, as best shown in Fig. 8. The carrier mechanism H preferably comprises suitably supported transverse shafts h, parallel sprocket wheels i on each of said shafts, parallel sprocket belts j mounted on the said shafts, and transverse bars k separated by intervening spaces sufficiently wide to receive a stick or section of candy, each, and disposed between and connected with the belts j. The lower traverse of the bars k is above and in close proximity to the upper surface of the table G, and the movement of the bars with the belts j is so timed that a space between two of the bars will be in a position to receive a stick or section of candy as said stick or section is impelled, by the belt 30, upon the table G. The carrier mechanism H is driven from the shaft e of the twisting mechanism through the sprocket wheel l on said shaft, the sprocket belt m and the sprocket wheel n on one shaft h, and hence it will be manifest that the sticks or sections of candy received in the spaces between the bars k will be rolled on the table G before the bars k, and because of the friction between the sticks and the table, and in that way will be straightened with a view of rendering the same more perfect and marketable. The direction of movement of the sticks or sections of candy before the bars k is toward the opening g in table G, and each stick or section of candy as it reaches said opening drops through to the cooler mechanism, hereinafter described.

Experience has demonstrated that the sticks or sections of candy are liable to render the means in front of which they are rolled sticky, and therefore in order that the carrier mechanism H may be readily cleaned and kept clean and in a high state of efficiency, we prefer to equip each cross-bar k with a cover such as best shown in Fig. 2. The said cover I is preferably formed of non-corrosive sheet-metal and is preferably of inverted-U-shape in cross-section so that when it is placed on its complementary bar k its sides by tending to spring inwardly will retain it in position. The covers I of the bars k alone contact with the sticks or sections of candy rolled before the bars, and by virtue of the construction just described it will be manifest that when the covers are rendered sticky by collected candy, the covers may be readily removed from the bars and cleaned, and after being cleaned said covers may be as readily replaced on the bars.

The before mentioned cooler of our improvements preferably comprises four transverse shafts p, arranged at one end of the cooler, six transverse shafts $r$ arranged at the opposite end of the cooler, two parallel sprocket wheels $s$ arranged on each of the said shafts $p$ and $r$, parallel sprocket belts $t$ arranged on said wheels, and transversely-disposed pendent or hanging trays M disposed between and hung from the belts $t$. Each of the said trays is of a size to receive and carry a single stick or section of candy, and each tray is moreover of concave form in cross-section so as not to impair the stick or section incidental to the carriage thereof, and is provided at its ends with upwardly extending hangers $u$ which are connected in a pivotal manner with the belts $t$. We prefer to form the trays M, for obvious reasons, of sheet-metal, but do not of course desire to be understood as confining ourselves to that material.

Incidental to the operation of our improvements the belts $t$ of the cooler are driven in the direction indicated by arrow from the shaft $e$ of the twisting mechanism through a sprocket wheel $v$ on said shaft $e$, a sprocket belt $w$, and a sprocket wheel $x$ on one of the cooler shafts, and the movement of the belts $t$ is so timed that a stick or sections of candy will drop through the opening $g$ in table G into each tray M as the same passes below the said opening $g$. Then after taking the course indicated by arrows in Fig. 8—i. e., to and fro longitudinally above the straightening means and longitudinally to and fro below said straightening means, one of the hangers $u$ of each tray contacts with a stationary tappet N which serves to cant or tilt the tray to such an extent that the stick or section of candy therein is dumped on a belt P, after which the said hanger $u$ rides over and clears the tappet or trip N, and the tray to which the hanger belongs resumes its normal pendent position. Attention is here directed to the fact that the trays M always occupy a pendent position when passing around the wheels as well as when passing from one pair of wheels to another, and hence there is no liability of any one of the trays being accidentally discharged of its contents. The office of the belt P is to carry the cooled sticks or sections of candy to the point at which said sticks or sections are to be boxed, and obviously the said belt may be driven in the direction indicated by arrow from the lowermost shaft $p$ of the cooler, through a pulley $a^4$ on said shaft, a pulley $a^5$ fixed on the adjacent shaft $a^6$ of the belt P, and a crossed belt $a^7$ connecting said pulleys $a^4$ and $a^5$.

It will be readily noted from the foregoing that the longitudinal arrangement of the stretches of the cooler belts both below and above the straightening mechanism renders the cooler compact and yet assures each stick or section of candy being carried a considerable distance in the presence of a cooling agent, preferably atmospheric air, precedent to the discharge of the stick or section from the cooler. It will also be noted that the sticks or sections of candy are segregated and kept from contacting with each other from the time when they are cut from the strip until they are picked or otherwise removed from the belt P, this being an important feature of advantage, inasmuch as it precludes any one of the sticks or sections interfering with the proper straightening and cooling of any other.

It is thought that the operation of our improvements will be fully understood from the following description, and it is therefore deemed unnecessary to reiterate the same.

In conclusion we desire it distinctly understood that while the machine illustrated constitutes the best practical embodiment of our invention of which we are cognizant, we do not confine ourselves to the specific construction and relative arrangement of parts nor to the driving connections or the means utilized for driving the various working parts, as various changes in the construction and relative arrangement of parts may be made and the working parts may be driven in many ways, without involving departure from the spirit of our invention as defined in the claims appended.

Having described our invention, what we claim and desire to secure by Letters-Patent, is:

1. In a machine for the purpose described, the combination of means for taking hold of and carrying a strip of candy material and twisting the strip incidental to said carriage thereof, and means for subsequently effacing the roughness left on the strip by the holding and twisting thereof.

2. In a machine for the purpose described, the combination of means for taking hold of and carrying a strip of candy material and twisting the strip incidental to said carriage thereof, and rollers between which the strip is carried subsequently to the twisting thereof to efface the roughness left on the strip by the holding and twisting thereof.

3. In a machine for the purpose described, the combination of means for taking hold of and carrying a strip of candy material and twisting the strip incidental to said carriage thereof, means for subsequently effacing the roughness left on the strip by the holding and twisting thereof, means for subsequently separating a section from said strip, and means for then moving the separated section in the same direction as the strip is moved and at a greater speed than said strip.

4. In a machine for the purpose described, the combination of means for taking hold of and carrying a strip of candy material and twisting the strip incidental to said carriage thereof, means for subsequently effacing the roughness left on the strip by the holding and twisting thereof, means for subsequently separating a section from said strip, means for then moving the separated section endwise in the same direction as the strip is moved and at a greater speed than said strip, a table arranged to receive the end-strip and for also shooting the section upon the table, and means for rolling the section laterally on said table.

5. In a machine for the purpose described, the combination of means for moving a strip of candy material and twisting the strip incidental to said movement thereof, means for separating a section from said strip, a table, means for moving the separated section endwise in the same direction as the strip is moved and at a greater speed than said strip and for also shooting the section endwise upon the table, and means for rolling the section laterally on said table.

6. In a machine for the purpose described, the combination of means for taking hold of and carrying a strip of candy material and twisting the strip incidental to said carriage thereof, means for subsequently effacing the roughness left on the strip by the holding and twisting thereof, means for subsequently separating a section from said strip, a table, means for moving the separated section endwise in the same direction as the strip is moved and at a greater speed than said strip and for also shooting the section endwise in the same direction upon the table, and means for rolling the section on said table at an angle to said direction.

7. In a machine for the purpose described, the combination of a table, means, flush with the table, for shooting a section of candy endwise or in the direction of its length upon the table, and means for rolling the section laterally on said table.

8. In a machine for the purpose described, the combination of means for taking hold of and twisting a strip of candy material, means for separating sections from said strip, and means, located intermediate the holding and twisting means and the section-separating means, for effacing the roughness left on the strip by the holding and twisting means.

9. In a machine for the purpose described, the combination of means for taking hold of and carrying a strip of candy material and twisting the strip incidental to said carriage thereof, means for separating sections from said strip, and means, located intermediate the holding, carrying and twisting means and the section-separating means, for effacing the roughness left on the strip by the holding and twisting means.

10. In a machine for the purpose described, the combination of means for twisting a strip of candy material, means for separating sections from said strip, a table, means for moving the separated sections endwise away from the section-separating means at a higher rate of speed than the strip is presented to said means, and for shooting the sections endwise upon the table; the said table being flush with said moving means and means for rolling the sections on the table at an angle to the direction in which the sections are impelled upon the table.

11. In a machine for the purpose described, the combination of means for taking hold of and twisting a strip of candy material, means for separating sections from said strip, a table, means for moving the separated sections endwise away from the section-separating means at a higher rate of speed than the strip is presented to said means and for shooting the sections endwise upon the table, means for rolling the sections on the table at an angle to the direction in which the sections are impelled upon the table, and means, located intermediate the holding and twisting means and the section-separating means for effacing the roughness left on the strip by the holding and twisting means.

12. In a machine for the purpose described, the combination of means for moving a strip of candy material endwise, means for separating sections from said strip, a table, means for moving the separated sections endwise away from the section-separating means faster than the strip is moved and for impelling said sections endwise upon the table; the said table being flush with said moving means and means for rolling the sections on the table at an angle to the direction in which the sections are impelled upon the table.

13. In a machine for the purpose described, the combination of means for taking hold of and carrying a strip of candy material endwise, means for separating sections from said strip, a table, means for moving the separated sections endwise away from the section-separating means faster than the strip is moved and for impelling said sections endwise upon the table; the said table being flush with said moving means, means for rolling the sections on the table at an angle to the direction in which the sections are impelled upon the table, and means for effacing roughness from the strip precedent to the presentation of the same to the section-separating means.

14. In a machine for the purpose described, the combination of means for moving a strip of candy material and twisting the strip incidental to said movement thereof, means for separating sections from the strip, means for guiding the strip at an angle to its original course and directing the strip to the section-separating means, a table arranged alongside the strip moving and twisting means, means for moving the separated sections endwise from the strip and impelling said sections endwise upon the table; said means being flush with the table, carrier mechanism for rolling the sections on the table at an angle to the direction in which the sections are impelled endwise upon the table, and a driving connection intermediate the first named means and the carrier mechanism for moving the latter by the former.

15. In a machine for the purpose described, the combination of means for moving a strip of candy material and twisting the strip incidental to said movement thereof, means for separating sections from the strip, means for guiding the strip at an angle to its original course and directing the strip to the section-separating means, a table arranged alongside the strip moving and twisting means, means for moving the separated sections endwise from the strip and impelling said sections endwise upon the table; said means being arranged flush with the table carrier mechanism for rolling the sections on the table at an angle to the direction in which the sections are impelled endwise upon the table, a driving connection intermediate the first named means and the section-separating means for operating the latter, and a driving connection intermediate the first named means and the carrier mechanism for moving the latter by the former.

16. In a machine for the purpose described, the combination of means for moving a strip of candy material and twisting the strip incidental to said movement thereof, means for separating sections from the strip, means for guiding the strip at an angle to its original course and directing the strip to the section-separating means, a table arranged alongside the strip moving and twisting means, means for moving the separated sections endwise from the strip and impelling said sections endwise upon the table; said means being flush with the table carrier mechanism for rolling the sections on the table at an angle to the direction in which the sections are impelled endwise upon the table, a traveler cooler adapted to receive the sections as they drop from the table, and driving connections intermediate the first named means and the section-separating means, the carrier mechanism, and the traveling cooler, respectively.

17. In a machine for the purpose described, the combination of means for moving a strip of candy material, means for separating sections from the strip, a table, means for moving the separated sections endwise upon the table; said means being flush with the table endless carrier mechanism for rolling the sections upon the table, and a driving connection intermediate the first-named means and the carrier mechanism.

18. In a machine for the purpose described, the combination of means for moving a strip of candy material, means for separating sections from the strip, a table, means for moving the separated sections endwise upon the table; said means being flush with the table endless carrier mechanism for rolling the sections upon the table, and driving connections between the first-named means and the section-separating means and the carrier mechanism, respectively.

19. In a machine for the purpose described, the combination of means for moving a strip of candy material, means for separating sections from the strip, a table, means for moving the separated sections endwise upon the table; said means being flush with the table endless carrier mechanism for rolling the sections upon the table, an endless traveling cooler adapted to receive the sections from the table, and driving connections between the first-named means and the carrier mechanism and the traveling cooler, respectively.

20. In a machine for the purpose described, the combination of means for moving a strip of candy material, means for separating sections from the strip, a table, means for moving the separated sections endwise upon the table; said means being flush with the table endless carrier mechanism for rolling the sections upon the table, an endless traveling cooler adapted to receive the sections from the table, and driving connections between the first named means and the section-separating means, the means for moving the separated sections, the carrier mechanism, and the traveling cooler, respectively.

21. In a machine for the purpose described, the combination of means for twisting a strip of candy material, means for separating a section from said strip, a table, means for moving the separated section in the same direction as the strip is moved and at a greater speed than said strip and for also shooting the section in the same direction upon the table; said means being flush with the table means for rolling the section on the table at an angle to said direction, and a movable cooler adapted to receive the sections from the table.

22. In a machine for the purpose described, the combination of means for moving a strip of candy material and twisting the strip incidental to said movement thereof, means for separating a section from said strip, a table, means for moving the separated section in the same direction as the strip is moved and at a greater speed than said strip and for also shooting the section in the same direction upon the table; said means being flush with the table means for rolling the section on said table at an angle to said direction, and a movable cooler adapted to receive the section from the table.

23. In a machine for the purpose described, the combination of means for taking hold of and carrying a strip of candy material and twisting the strip incidental to said carriage thereof, means for separating a section from said strip, a table, means for moving the separated section in the same direction as the strip is moved and at a greater speed than said strip and for also shooting the section in the same direction upon the table; said means being flush with the table means for effacing the roughness left on the strip by the holding, carrying and twisting means; said means being adapted to act on the strip before the same is presented to the separating means, means for rolling the section on the table, and a movable cooler adapted to receive the section from the table.

24. In a machine for the purpose described, the combination of means for moving a strip of candy material and twisting the strip incidental to said movement thereof, means for effacing the roughness left on the strip by the moving and twisting means, means for subsequently separating a section from the strip, a table, means for moving the separated section endwise in the same direction that the strip is moved and at a greater speed than said strip and for also shooting the section endwise upon the table; said means being flush with the table, means for rolling the sections or sticks of candy laterally or sidewise on the table, a cooler movable above and below the table and the means for rolling the sections or sticks on the table and adapted to receive the sections or sticks from the table, and means for receiving the sections or sticks of candy from said cooler.

25. In a machine for the purpose described, the combination of means for taking positive hold of and carrying and twisting a strip of candy material, means for effacing the roughness left on the strip by the holding and twisting thereof, means for guiding the strip at an angle to its initial course, subsequent to the effacement of the roughness, means for subsequently separating a section from the strip, a table, means for moving the separated section endwise and in line with the strip and at a greater speed than said strip and for also shooting the section endwise upon the table, means movable alongside the strip-holding, carrying and twisting means and adapted to roll the sections or sticks of candy laterally or sidewise on the table, a cooler movable above and below the table and the means for rolling the sections or sticks on the table and adapted to receive the sections or sticks from the table, and means for receiving the sections or sticks of candy from said cooler.

26. In a machine for the purpose described, the combination of means for taking positive hold of and carrying and twisting a strip of candy material, rollers for effacing the roughness left on the strip by the holding and twisting thereof, a roller adapted to coöperate with one of the first named rollers to guide the strip at an angle to its initial course, subsequent to the effacement of the roughness, means for subsequently separating a section from the strip, a table, means for moving the separated section endwise and in line with the strip and at a greater speed than said strip and for also shooting the section endwise upon the table; said means being in the form of a belt the upper stretch of which is flush with the table, means movable alongside the strip-holding, carrying and twisting means and adapted to roll the sections or sticks of candy laterally or sidewise on the table, a cooler movable above and below the table and the means for rolling the sections or sticks on the table and adapted to receive the sections or sticks from the table, and means for receiving the sections or sticks of candy from said cooler.

27. In a machine for the purpose described, the combination of a table, and a carrier mechanism comprising an endless carrier, the lower traverse of which is above and adjacent the upper surface of the table, transverse bars on said carrier and spaced apart, and removable covers arranged on said bars in position to engage sticks of candy.

28. The combination in a candy making machine, of a table, bars movable above and adjacent the table and spaced apart, and removable covers arranged on said bars in position to engage sticks of candy.

29. The combination with cross-bars for the purpose set forth, of removable covers arranged on said bars and each formed of sheet-metal in inverted U-shape in cross-section and having sides that tend to spring inwardly and retain it in position on its respective cross-bar.

30. In a machine for making stick candy, the combination of a table, means for rolling sticks or sections of candy sidewise on the table, and a cooler comprising spaced trays each of which is provided with a bottom that is concave in cross-section and is adapted to receive one stick or section of candy from the table, and means for moving the said trays.

31. In a machine for making stick candy, the combination of a table, means for rolling sticks or sections of candy sidewise on the table, a cooler comprising spaced pendent trays each of which is provided with a bottom that is concave in cross-section and is adapted to receive one stick or section of candy from the table, movable means carrying the pendent trays, and means for tilting the pendent trays in succession to discharge the same.

32. In a machine for making stick candy, the combination of a table, means for rolling sticks or sections of candy sidewise on the table, and a cooler comprising an endless carrier extending above and below the table and the stick-rolling means, and spaced trays on said carrier, each of said trays having a bottom that is concave in cross-section and is adapted to receive one stick or section of candy from the table.

33. In a machine for making stick candy, the combination of a table, means for rolling sticks or sections of candy sidewise on the table, a cooler comprising an endless carrier extending above and below the table and the stick-rolling means, and spaced, pendent trays on said carrier, each of said trays having a bottom that is concave in cross-section and is adapted to receive one stick or section of candy from the table, and means for tilting the pendent trays in succession to discharge the same.

34. The combination of a table, means for moving sections or sticks of candy, endwise, to the table, means for rolling the sticks of candy on the table, a cooler comprising an endless carrier arranged above and below the table and the last named means, swinging trays pendent from the endless carrier and arranged transversely thereof and having bottoms concave in cross-section; said trays being each adapted to receive a stick of candy from the table, a stationary tappet for tilting the trays one by one, and means for receiving the sticks of candy from the tilted trays.

In testimony whereof we have hereunto set our hands in presence of two subscribing witnesses.

WILLIAM T. HUDSON.
PAUL R. CAMP.

Witnesses:
J. H. JOHNSTON,
WOODS W. ROGERS.